United States Patent [19]

Colombo et al.

[11] 3,897,364
[45] July 29, 1975

[54] PROCESS FOR THE PREPARATION OF CATALYSTS FOR THE POLYMERIZATION OF OLEFINS

[75] Inventors: Paolo Colombo, Saronno; Marco Galliverti, Legnano, both of Italy

[73] Assignee: Societa' Italiana Resine S.I.R. S.p.A., Milan, Italy

[22] Filed: Dec. 27, 1972

[21] Appl. No.: 318,812

[30] Foreign Application Priority Data
Dec. 27, 1971 Italy.................................. 32949/71

[52] U.S. Cl......... 252/429 C; 260/93.7; 260/94.9 D
[51] Int. Cl............................................... B01j 11/84
[58] Field of Search.................... 252/429 C, 429 A

[56] References Cited
UNITED STATES PATENTS

| | | | |
|---|---|---|---|
| 2,989,516 | 6/1961 | Schneider.................... | 252/429 B X |
| 3,168,484 | 2/1965 | Engel et al..................... | 252/429 A |
| 3,252,959 | 5/1966 | Moretti et al.............. | 252/429 A X |

OTHER PUBLICATIONS

Mole et al., Organoaluminum Compounds, Elsevier Pub. Co., N.Y., N.Y. (1972), page 60.
Nesmeyanov et al., Methods of Elemento–Organic Chemistry, Vol. 1, The World Pub. Co., N.Y., N.Y. (1967), pages 406 & 410.

*Primary Examiner*—Patrick P. Garvin
*Attorney, Agent, or Firm*—Sughrue, Rothwell, Mion, Zinn and Macpeak

[57] ABSTRACT

A catalyst for polymerisation of ethylene and other alpha-olefins comprising a combination of a metallorganic derivative of the elements belonging to groups IA, IIB and IIIB of the periodic system and a supported halide of a transition metal of group IVB and VB of the periodic system, the said supported halide being obtained by reaction of the halide with the solid product resulting from suitable deposition of metallic aluminium on an activated alumina and/or silica and/or silico-aluminate.

11 Claims, No Drawings

PROCESS FOR THE PREPARATION OF CATALYSTS FOR THE POLYMERIZATION OF OLEFINS

The present invention relates to a process for the polymerisation of olefins and in particular to a process for the preparation of polymers from ethylene and alpha olefins and of copolymers of ethylene with alpha olefins.

From another aspect, the invention relates to catalysts suitable for the preparation of polymers from ethylenes and alpha olefins and copolymers of ethylenes with alpha olefins, and a process for the preparation of such catalysts.

Yet another aspect of the invention relates to catalysts suitable not only for polymerisation of oefins but also the stereospecific polymerisation of alpha olefins.

It is well-known that the polymers and copolymers of olefins can be obtained by polymerising the monomers with catalysts of the Ziegler type, such catalysts being the products obtained by bringing into contact compounds of transition metals with metals, hydrides or organo-metallic derivatives of the elements belonging to groups IA, IIB and IIIB of the periodic system.

It is also known that the stereospecific polymerisation of alpha olefins, such as propylene, into crystalline polymers with high proportions of isotactic structures is normally achieved in the presence of Ziegler type catalysts, where the compound of transition metal used is titanium trichloride.

For this purpose, titanium trichloride may be produced by reduction of titanium tetrachloride under suitable conditions by different reagents such as hydrogen, metallic aluminium or an organic derivative of aluminium, or by photochemical decomposition at ambient temperature of titanium trichloromonoalkyl groups obtained by reaction of titanium tetrachloride and aluminium alkyls at low temperatures.

The said processes, in addition to being economically unfavorable, also have the drawback that the characteristics of the catalysts, and thus the characteristics of the polymers produced, particularly their stereospecificity, come to depend on the methods by which the titanium trichloride is obtained.

Titanium tri-chloride may also be produced from titanium tetrachloride directly in the reaction medium or immediately prior to polymerisation. This process, too, has drawbacks, particularly considerable operative difficulties due to the series of delicate and complicated operations which have to be performed industrially.

Furthermore, the catalytic activity of stereospecific catalysts based on titanium trichloride, however produced, is not particularly high, so that the polyolefins obtained have finally to be subjected to very thorough purification processes in order to eliminate the residues of catalyst and this has the effect of substantially burdening the costs of the final product.

In order to avoid these drawbacks, catalysts have been proposed for the stereospecific polymerisation of alpha-olefins, wherein the titanium trichloride is deposited on the inert solid supports which are of large active surface area.

The supported catalysts are frequently used in industry by virtue of the many advantages which lie in their use, particularly the high activity due to the great active surface area and the substantial simplifications in the processes of purification of the end products.

There are however considerable difficulties in the preparation of supported catalysts based on titanium trichloride which has considerable activity in the stereospecific polymerisation of alpha-olefins.

In fact, apart from the technical difficulties of the operation the titanium trichloride may not be deposited as such on the solid inert supports of large surface area without substantial losses of activity and stereospecificity.

Attempts have therefore been made to impregnate the inert supports with titanium tetrachloride and to proceed then with the reduction thereof to trichloride.

However, in addition to further complications in the already complex processes, for the reduction of titanium tetrachloride, this method results in catalysts of not very high stereospecificity.

Further difficulties derive from the nature of the supports which have to have particular structures and well-defined characteristics of surface area, porosity, and reactivity with respect to the transition compounds.

A very simple process has now been found which makes it possible in an economically advantageous manner, to obtain supported catalysts of high activity and stereospecificity in the polymerisation of olefins. Such catalysts may be used with satisfactory results both in the stereospecific polymerisation of alpha-olefins and in the polymerisation of olefins.

In particular, the said catalysts can be applied to the stereospecific polymerisation of propylene, in the polymerisation of ethylene and in the polymerisation of ethylene with propylene and 1-butene.

In addition, the said catalysts are characterised in that their behaviour is well-defined and constant, since the conditions in which they are prepared are easily reproducible and therefore produce polymers of clearly-defined and constant properties.

More precisely according to the present invention ethylene and/or the alpha olefins are polymerised in the presence of a solid catalyst comprising a combination of a metallorganic derivative of the elements belonging to groups IA, IIB, and IIIB of the periodic system and a supported halide of a transition metal of group IVB and VB of the periodic system, the said supported halide being obtained by reaction of the halide with the solid product resulting from suitable deposition of metallic aluminium on an activated alumina and/or silica and/or silico-aluminate. It is already known to use aluminas and silico-aluminates in the preparation of catalysts for the polymerisation of ethylene and/or alpha olefins. It is also known however that the aluminas and the silico-aluminates used for such purposes have to have particular structures and well-defined characteristics of surface area, porosity and reactivity with respect to the halides of the transition metals.

The catalysts of the present invention can however be obtained from any type of alumina and/or silica and/or silico-aluminates independently of the chemico-physical characteristics, although of a surface area at least greater than 10 sq.m/g and a granulometric distribution comprised in the range from 10 to 150 microns.

As aluminas, silicas and silico-aluminates, it is possible easily to use the products normally available commercially, or the products of calcination of the hydroxides obtained from precipitation from solutions of aluminium salts.

In view of the direct relationship between dimensions of the granule of final polymer and the granulometry of the catalyst, then for greater homogeneity in the properties of the polymer obtained and for easier execution of the processes, it is more suitable to use fine powders of aluminas, silicos and silico-aluminates with a more restricted granulometric distribution, for example 20 to 80 microns.

The aluminas, silicas and silico-aluminates, both the commercial grades and those obtained by calcination of hydroxides of precipitation, according to the invention, must be subjected to an activation treatment.

The said treatment consists in subjecting the aluminas, silicas and silico-aluminates, for example in rotary kilns or in a fluid bed reactor, to a temperature ranging from 350° to 900°C, for a period ranging from 2 to 25 hours, and preferably at a temperature ranging from 450° to 650° for a time ranging from 5 to 15 hours, in an atmosphere of anhydrous air or nitrogen.

One of the essential aspects of the present invention is the phase involving deposition of metallic aluminium on the aluminas, silicas and/or silico-aluminates activated as above.

The deposition phase may be carried out by various methods.

In one form of embodiment, a mixture of a metallic aluminium powder and an alumina and/or silica and/or silico-aluminate is maintained at a temperature above the melting point of aluminium for a period ranging from 5 to 20 hours.

In this way, a product is obtained in which the metallic aluminium is finely dispersed.

It is possible for example to work in a rotary oven into which the powders of aluminium and the aluminas and/or silicas and/or silico-aluminates are introduced, already mixed.

This mixing of powders may be carried out either mechanically or by suspension of the aluminium powders and particles of alumina and/or silica and/or silico-aluminate in an hydrocarbon solvent, for example n-pentane or n-heptane, the solvent being subsequently evaporated.

It is very important that the granulometry of the aluminium powder be comprised in the range from 0.1 to 10 microns.

In a preferred form of embodiment of the present invention, the working temperature ranges from 700° to 1000°C, and the working time ranges from 10 to 15 hours, with mixtures containing aluminium powders of a granulometry ranging from 0.5 to 5 microns.

The quantity of aluminium is so regulated that the end product has a highly dispersed aluminium content of between 0.05 and 5% by weight. The metallic aluminium may also be deposited by initially impregnating the activated aluminas and/or silicas and/or silico-aluminates, with aluminium hydride or a metallorganic product of aluminium, both in solution. As solvents for the hydrides, it is possible to use alphatic or aromatic ethers, for example ethyl ether, while for the metalloorganic compound it is possible to use aliphatic or aromatic hydrocarbons, for example heptane or benzene.

Impregnation is preferably performed in a fluid bed at a temperature ranging from 20° to 100°C, and even more preferably 20° to 40°C, the solvent being eliminated by evaporation at the actual impregnation temperature over a period of 1 to 10 hours and preferably 1 to 5 hours.

The impregnation phase is then followed by an activation phase at a temperature above that of decomposition of the hydride or of the metallorganic aluminium compound.

In a preferred form of embodiment, the working temperature is at least 30°C higher than the decomposition temperature of the hydride or of the metallorganic compound, the working time ranging from 5 to 20 hours, and preferably 10 to 15 hours.

The quantities of hydride or aluminium metallorganic compound are so regulated that the solid end product in this case, too, have a content of highly dispersed aluminium ranging from 0.05 to 5 percent by weight.

The product which is obtained in this way is then caused to react with a halide of a transition metal of groups IVB and VB of the periodic system, and more particularly with the chlorinated derivatives of titanium or vanadium, preferably titanium tetrachloride or vanadium oxychloride.

The reaction is carried out at a temperature between 100 and 350°C and preferably between 225° and 300°C, in a pressure resistant reactor if the presence of a liquid phase is desired, or in a fluid bed reactor.

The relative quantities of reaction of chlorinated derivatives of titanium or vanadium and the solid support are so regulated that the molar ratio of chlorinated derivatives to supported metallic aluminium ranges from 100 to 1000 and preferably from 150 to 400.

Under these conditions, the reduction of the halide of the transition metal is substantially completed in from 10 to 30 hrs.

Any residues of titanium tetrachloride are carried away by a suitable washing process, for example with n-heptane.

The resultant solid catalyst, consisting of the halide of the transition metal, in reduced form, finely dispersed on the support, is activated by means of an organometallic compound chosen from among the organic derivatives of metals of groups IA, IIB and IIIB of the periodic system.

Preferably used as activators are organometallic halides and completely alkylic derivatives, particularly aluminium trialkyls, the halides of dialkyl aluminium and zinc dialkyls. These latter also act as molecular weight regulators. The relative quantities of organometallic compound and fixed transition metal are so regulated that their molar ratios are comprised between 5 and 100, preferably between 10 and 50.

The catalyst may be activated immediately prior to introduction of the monomers, directly in the polymerisation reactor in intermittent tests or in a suitable reactor upstream of the reaction system if the process is continuous.

The temperature at which such activation occurs is between 20 and 100°C and preferably between 40 and 100°C.

The activated catalyst may also be left to mature for a more or less prolonged period at the activation temperatures.

The catalytic system which is thus obtained is used for the polymerisation and copolymerisation of olefins and in particular for the preparation of polyethylenes, polypropylenes and copolymers of ethylene/propylene and ethylene/1-butene, in which the ethylene is present in quantities equal to or greater than 90 percent or less than 10 percent by weight. Polymerisation and copolymerisation may be carried out by the known techniques: in the gaseous phase or in a liquid heterogeneous phase.

In the case of the liquid phase, the reaction is carried out in the presence of an aliphatic or aromatic inert hydrocarbon diluent at temperatures comprised between 50 to 100°C and at pressures of between 5 and 35 atm.

Solvents which may be used are for example saturated aliphatic hydrocarbons, aromatic hydrocarbons and chlorinated hydrocarbons, for example chlorobenzene, heptane, pentane, benzene, cyclohexane.

Polymerisation may be carried out in a steel pressurised autoclave into which are introduced the anhydrous solvent, in which the catalyst is suspended in quantities of 50 to 500 mg/l, and also the monomers in gas or liquid form.

The polymers are obtained in the form of powders of controlled granulometry, which is a function of the granulometric distribution of the initial catalyst, with yields comprised between 80 and 120 kg/g of transition metal.

Working according to the present invention has the further advantage that during polymerisation, small quantities of waxes form so that in a continuous process, by filtering out any cloudiness emanating from the reactor, in an anhydrous and inert ambient, it is possible to recover a substantial portion of organometallic compound and to recycle it to the reaction medium.

The solid polymer obtained after filtration is treated with steam so, as to decompose the catalyst, eliminate the traces of residual solvent and carry out a purification, although on a minimal scale.

The invention will now be illustrated by the following examples which are not however intended to constitute any limitation of the scope of the present invention.

EXAMPLE 1

In a fluid bed reactor are placed 50 g commercial alumina to the following specification:

| | |
|---|---|
| surface area | 125 sq.m/g |
| granulometric distribution | 20–60 microns |
| porosity | 0.41 ml/g. |

This is fluidised with dry air, the temperature being raised to 600°C. These conditions are maintained for 10 hours.

The medium is then cooled to 40°C, the air being replaced by dry nitrogen, and, still under conditions of fluidity and in a stream of nitrogen, the alumina is impregnated with a solution of ethyl ether containing 1 percent aluminium hydride until the aluminium hydride content of the alumina is equal to 0.52 percent by weight.

The ethyl ether is then eliminated over a period of 5 hours at 40°C.

Subsequently, the temperature of the mixture is raised to 250°C the whole being maintained at that temperature for 12 hours, fluidised conditions still being maintained, together with a stream of nitrogen.

20 g of the resultant product were then transferred, together with 50 ml of titanium tetrachloride ($d = 1.72$ g/ml) to a cylindrical pressure-resistant stainless steel reactor rotating about its axis. The reactor was then rotated in an oil bath in which the temperature was maintained at 275°C. The reduction reaction was completed in this way in 20 hours.

The solid product obtained was subjected to repeated washings in a suspension of anhydrous heptane in order to eliminate the final traces of titanium tetrachloride. The product obtained after filtration and drying consisted substantially completely of supported titanium trichloride with a titanium titre equal to 0.73 percent.

Into a 3-litre stainless steel autoclave fitted with a heat exchange liner, agitator, pressure gauge and thermometer pocket were then introduced, at 70°C, 500 ml of anhydrous heptane containing 150 mg of catalyst prepared as above and 500 ml of anhydrous heptane containing 680 mg of diethyl aluminium chloride.

At a working temperature of 70°C, hydrogen was added to the autoclave until the pressure became 4 kg/sq.cm, and then ethylene up to 14 kg/sq.cm, and these conditions were then maintained for the next 2 hours by the continuous introduction of ethylene.

In this way, 107 g of powdered polyethylene were obtained, to the following specifications:

| | |
|---|---|
| specific gravity | 0.961 g/ml |
| melting index | 0.8 g/10 mins. at 190°C. |

EXAMPLE 2

500 ml of anhydrous heptane containing 172 mg of a catalyst prepared as in Example 1, and 500 ml anhydrous heptane containing 1.26 g of diethyl aluminium chloride were placed in an autoclave such as that described in Example 1, at 40°C. 140 g of propylene were then added, the temperature raised to 60°C and polymerisation carried out for 4 hours, the temperature being maintained constant. In this way, 85 g polypropylene were obtained to the following specifications:

| | |
|---|---|
| melting point | 160°C |
| specific gravity | 0.902 g/ml |
| percentage by weight extracted in boiling heptane | 7.2 |

EXAMPLE 3

50 g of commercial alumina of the same type as that described in Example 1 were added to 1 g of an aluminium powder of high purity with a granulometric distribution of 0.5 to 5 microns and the whole was closely blended. The resultant mixture was placed in a small rotary oven in which a weak flow of nitrogen was maintained. The temperature was raised to 750°C and the whole was kept at that temperature for 15 hours.

It was then cooled, still in a stream of nitrogen, after which a greyish powder was obtained. 20 g of that powder were then transferred, together with 50 ml of titanium tetrachloride (specific gravity 1.72 g/cc) into a cylindrical pressure-resistant stainless steel reactor rotating about its axis, after the same procedure was adopted as in Example 1. The end product consisted virtually completely of supported titanium trichloride with a titanium content equal to 0.8 percent.

In an autoclave such as that described in the preceding examples were placed 500 ml of anhydrous heptane of anhydrous heptane containing 160 mg of catalyst prepared as above and 500 ml containing 1.07 g of diethyl aluminium chloride. In the autoclave were then placed 32 g of 1-butene and then, working at 70°C, ethylene up to a pressure of 12 kg/sq.cm. These conditions were maintained for 3 hours, ethylene being supplied continuously. In this way, 60 g of ethylene-1-butene copolymer were obtained having the following properties:

| | |
|---|---|
| melting point | 120 – 121 C |
| specific gravity | 0.948 g/ml |
| number of methyl groups to every 1000 carbon atoms: | 10.8 |
| number of vinyl groups per 1000 carbon atoms: | 0.07 |
| number of vinylene groups per 1000 carbon atoms: | 0.03 |

EXAMPLE 4

500 ml anhydrous heptane containing 135 mg of a catalyst prepared as in Example 3 and 500 ml anhydrous heptane containing 770 mg diethyl aluminium chloride were placed in an autoclave such as that described in the previous examples. 120 g of propylene were then added to the autoclave and then, working at 80°C, the pressure was raised to 12 kg/sq.cm by the introduction of ethylene. These conditions were maintained for 3 hours, ethylene being continuously supplied. In this way, 93 g of ethylene-propylene copolymer were obtained, with the following properties:

| | |
|---|---|
| melting point | 124°C |
| specific gravity | 0.936 g/ml |
| number of methyl groups to every 1000 carbon atoms: | 23.1 |
| number of vinyl groups to every 1000 carbon atoms: | 0.085 |
| number of vinylene groups per 1000 carbon atoms: | 0.03. |

What we claim is:

1. Process for the preparation of catalysts suitable for the production of polymers of ethylene and alpha-olefins and of copolymers of ethylene with alpha-olefins, consisting essentially of an organo-metallic compound and the product of interaction between a halogenated compound of a transition metal and a solid granular support, characterized in that at a temperature between 100 and 350°C and for a period of 10 to 30 hours, a halide transition metal in groups IVB and VB of the periodic system is caused to react with a solid granular support obtained by deposition of metallic aluminum on an alumina, silica, silico-alumina or mixtures thereof with a surface area at least greater than 10 sq.m/g and a granulometric distribution of between 10 to 150 microns, obtained after activation at a temperature of between 350 and 900°C for a period of 2 to 25 hours, such deposition being carried out in such a way that the end product has a content of highly dispersed aluminum comprised between 0.05 and 5% by weight, the relative quantities of transition metal halide and solid support used in the reaction being so regulated that the molar ratio of transition metal halide to supported metallic aluminum is between 100 and 1000, and in that, at a temperature of 20° to 100°C the product of such reaction is brought into contact with an organometallic compound chosen from aluminum trialkyls, halides of dialkyl aluminum, or zinc dialkyls, the relative quantities of organometallic compounds and of fixed transition metal being so regulated that their molar ratios are comprised between 5 to 100.

2. Process according to claim 1, characterised in that the deposition of metallic aluminium takes place by preparing a mixture of a powder of metallic aluminium of a granulometry between 0.1 and 10 microns and alumina, silica, silico-aluminate or mixtures thereof, and by maintaining the said mixture at a temperature above the melting point in the mixture being so regulated that the end product has an aluminium content of between 0.05 and 5 percent by weight.

3. Process according to claim 2, characterised in that the mixtures are prepared from a metallic aluminium powder of a granulometry between 0.5 and 5 microns and in that such mixtures are maintained at a temperature between 700 and 1000°C for a period of between 10 and 15 hours.

4. Process according to claim 2, characterised in that the mixtures of aluminium powder and particles of alumina silica silico-aluminate or mixtures thereof are prepared mechanically.

5. Process according to claim 2, characterised in that the mixtures of aluminum powder and particles of alumina, silica, silico-aluminate or mixtures thereof are prepared by suspension of the powders of aluminum and particles of alumina, silica, silico-aluminate or mixtures thereof in a hydrocarbon solvent, after which the solvent is evaporated.

6. Process according to claim 1, characterized in that the deposition of metallic aluminum is achieved by impregnation in a fluid bed at a temperature between 20° and 100°C, of the aluminas, silicas, silico-aluminates or mixtures thereof with aluminum hydride or a metallorganic compound of aluminum in solution, followed by evaporation of the solvent at the same temperature as impregnation in a period ranging from 1 to 10 hours, and activation of the product obtained at a temperature above that of decomposition of the hydride or of the metallorganic compound of aluminum for a period of 5 to 20 hours, the quantities of hydride or of metallorganic compound of aluminum being so regulated that the end product has an aluminum content of between 0.05 and 5 percent by weight.

7. Process according to claim 6, characterised in that the deposition of metallic aluminium is achieved by impregnation at a temperature between 20° and 40°C, evaporation of the solvent over a period of 1 to 10 hours and activation at a temperature at least 30°C above that of decomposition of the hydride or of the metallorganic compound for a period of 10 to 15 hours.

8. Process according to claim 6, characterised in that in impregnation, solvents for the hydrides are aliphatic or aromatic ethers while solvents for the metallorganic compounds are aliphatic or aromatic hydrocarbons.

9. Process according to claim 1, characterized in that the transition metal halide used is titanium tetrachloride or vanadium oxychloride.

10. Process according to claim 1, characterised in that the reaction between transition metal halide and the solid granular support is carried out at 225° to 300°C, the relative quantities of reaction being such that the molar ratio of transition metal halide to supported metallic aluminium is between 150 to 400.

11. Process according to claim 1, characterised in that said compound chosen from aluminum trialkyls, halides of dialkyl aluminum or zinc dialkyls is used in quantities such that the molar ratios, with respect to the fixed transition metals, are comprised between 10 to 50, the temperature at which these ingredients are brought into contact being regulated in the range from 40° to 100°C.

* * * * *